(12) United States Patent
Gillette

(10) Patent No.: US 6,264,714 B1
(45) Date of Patent: Jul. 24, 2001

(54) ORGANIC LAWN TREATMENT AND FERTILIZATION PROGRAM

(75) Inventor: Timothy J. Gillette, North Kingstown, RI (US)

(73) Assignee: Pure Barnyard Company LLC, Raymond, NH (US)

( * ) Notice: Subject to any disclaimer, the term of this patent is extended or adjusted under 35 U.S.C. 154(b) by 0 days.

(21) Appl. No.: 09/791,068

(22) Filed: Feb. 22, 2001

(51) Int. Cl.[7] .............................. C05F 3/00; C05F 11/08
(52) U.S. Cl. ................................. 71/15; 71/22; 71/23
(58) Field of Search .................................. 71/15, 22, 23

(56) References Cited

U.S. PATENT DOCUMENTS

| | | | |
|---|---|---|---|
| 5,030,268 | * | 7/1991 | Christians ................................. 71/79 |
| 5,730,772 | * | 3/1998 | Staples ...................................... 71/9 |
| 5,783,190 | * | 7/1998 | Czapla et al. ..................... 424/195.1 |
| 6,047,908 | * | 4/2000 | Seymour et al. ..................... 239/675 |

FOREIGN PATENT DOCUMENTS

04179411 * 6/1992 (JP) .

* cited by examiner

Primary Examiner—Chhaya D. Sayala
(74) Attorney, Agent, or Firm—Davis & Bujold, P.L.L.C.

(57) ABSTRACT

A method of treating and fertilizing a lawn comprising separate applications of corn gluten, 100% poultry manure organic lawn/plant fertilizer and milky spore organic soil conditioner in controlled amounts at specific times over a three year period, the times being early spring, late spring/early summer, mid to late summer and late fall or about 50 to 60 days apart commencing in early spring while forsythia is blooming but before lilacs bloom.

2 Claims, 1 Drawing Sheet

ORGANIC LAWN TREATMENT AND FERTILIZATION PROGRAM

BACKGROUND OF THE INVENTION

This invention to an innovative method of treating and fertilizing lawns.

OBJECT OF THE INVENTION

It is an object of the present invention to provide an economic, effective and simple method of treating and fertilizing a lawn.

BRIEF DESCRIPTION OF THE DRAWINGS

The invention is illustrated in FIG. 1, by way of example, which is a flow chart of the method of the present invention.

DESCRIPTION OF THE PREFERRED EMBODIMENTS

Figure 1:
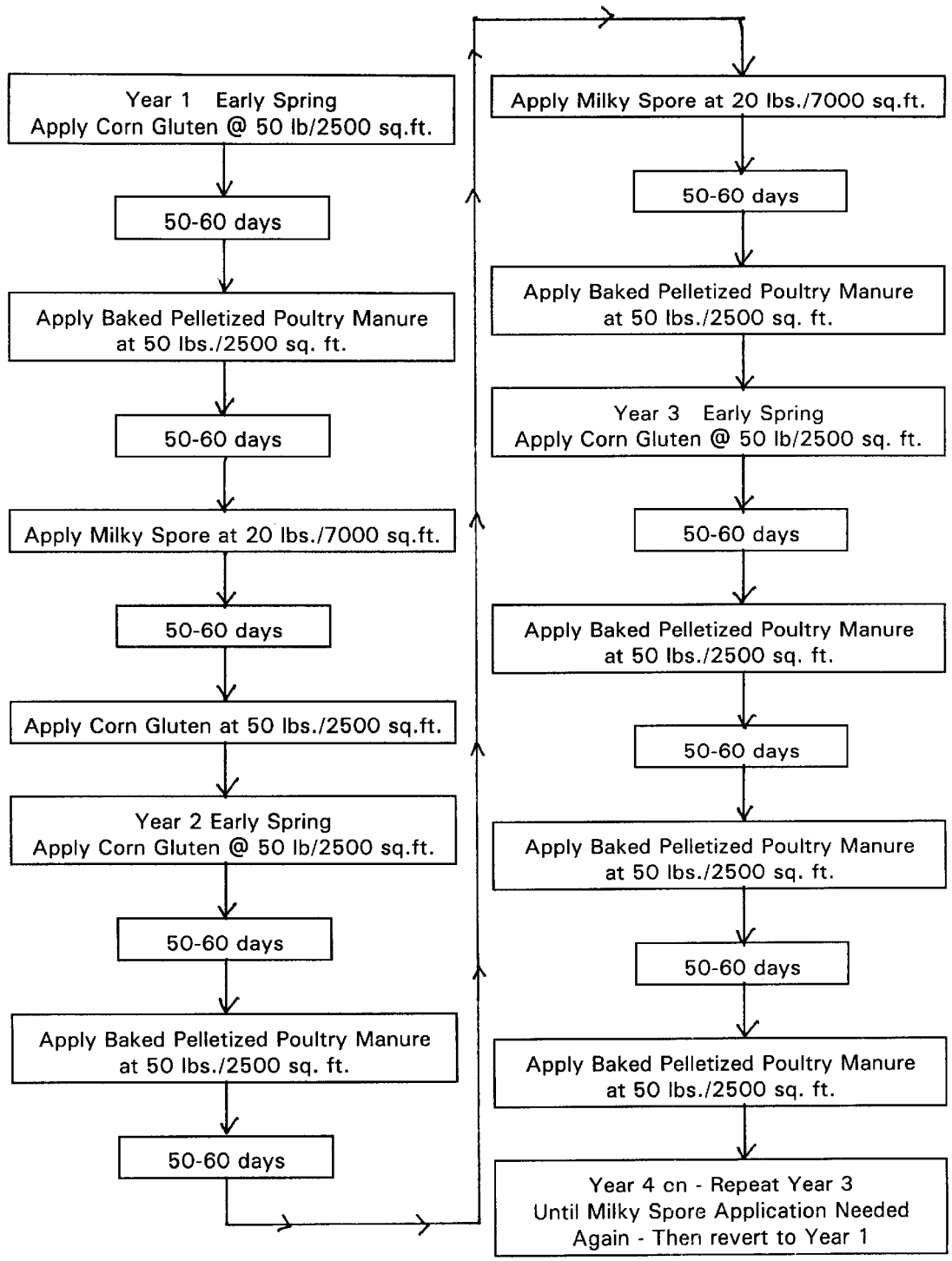

With reference to FIG. 1, the method of treating and fertilizing lawns of the present invention comprises:

First Year—Step 1—Early spring: Apply corn gluten organic weed/feed to lawn at about 50 lbs./2500 sq. ft. while forsythia is blooming, but before lilacs bloom.

Step 2—about 50–60 days after Step 1: Apply 100% poultry manure organic lawn/plant fertilizer to lawn at about 50 lbs./2500 sq. ft., (i.e., in late spring/early summer).

Step 3—about 50–60 days after Step 2: Apply milky spore organic soil conditioner to lawn at about 20 lbs./7000 sq. ft. (i.e. in mid to late summer).

Step 4—about 50–60 days after Step 3: Apply corn gluten organic weed/feed to lawn at about 50 lbs./2500 sq. ft . (i.e. in late fall).

Second Year—Step 1—Early spring: Apply corn gluten organic weed/feed to lawn at about 50 lbs./2500 sq. ft. while forsythia is blooming, but before lilacs bloom.

Step 2—about 50–60 days after second year Step 1: Apply 100% poultry manure organic lawn/plant fertilizer to lawn at about 50 lbs./2500 sq. ft. (i.e. in late spring/early summer).

Step 3—about 50–60 days after second year Step 2: Apply milky spore organic soil conditioner to lawn at about 20 lbs./7000 sq. ft. (i.e. in mid to late summer).

Note: No more milky spore soil treatments will be necessary for approximately 10 years.

Note: Only 1 application of corn gluten organic weed/feed per year will be required from now on for 100% weed control of crab grass, dandelions, chick weed, and most broad leaf weeds in lawn.

Step 4—about 50–60 days after second year step 3: Apply 100% poultry manure organic lawn/plant fertilizer to lawn at about 50 lbs./2500 sq. ft. (i.e. in late fall).

Third and subsequent years (until further application of milky spore is required)—Step 1—Early spring: Apply corn gluten organic weed/feed to lawn at about 50 lbs./2500 sq. ft. while forsythia is blooming, but before lilacs bloom.

Step 2—about 50–60 days after Step 1 in third and subsequent years: Apply 100% poultry manure organic lawn/plant fertilizer to lawn at about 50 lbs./2500 sq. ft., (i.e. in late spring/early summer).

Step 3—about 50–60 days after Step 2 in third and subsequent years: Apply 100% poultry manure organic lawn/plant fertilizer to lawn at about 50 lbs./2500 sq. ft. (e.g. in mid to late summer).

Step 4—about 50–60 days after Step 3 in third and subsequent years: Apply 100% poultry manure organic lawn/plant fertilizer to lawn at about 50 lbs./2500 sq. ft. (e.g. in late fall).

Corn gluten is an organic feed containing about 1 percent animal fat as a binder and which has been pelletized and crumbled into a granular form.

The poultry manure is dried by baking and pelletized to produce a slow release fertilizer and is available from Pure Barnyard Company L.L.C., Raymond, N.H.

Milky spore is available from St. Gabriel Labs, Gainsville, Va. and contains a bacteria (*Bacillus Populas*) which kills beetle grubs Application may be by a manual spreader of any common type.

I claim:

1. A method for a 3 year program for treating a lawn comprising the steps of:
   a) in year 1—While forsythia is blooming, but before lilacs bloom, applying corn gluten organic weed/feed to lawn at about 50 lbs./2500 sq. ft.;
   b) at about 50–60 days after Step a) applying 100% poultry manure organic lawn/plant fertilizer to lawn at about 50 lbs./2500 sq. ft.;
   c) at about 50–60 days after Step b) applying milky spore organic soil conditioner to lawn at about 20 lbs./7000 sq. ft.;
   d) at about 50–60 days after Step c) applying corn gluten organic weed/feed to lawn at about 50 lbs./2500 sq. ft;
   e) in year 2—While forsythia is blooming, but before lilacs bloom, applying corn gluten organic weed/feed to lawn at about 50 lbs./2500 sq. ft.;
   f) at about 50–60 days after Step e) applying 100% poultry manure organic lawn/plant fertilizer to lawn at about 50 lbs./2500 sq. ft.;
   g) at about 50–60 days after Step f) applying milky spore organic soil conditioner to lawn at about 20 lbs./7000 sq. ft.;
   h) at about 50–60 days after Step g) applying 100% poultry manure organic lawn/plant fertilizer to lawn at about 50 lbs./2500 sq. ft.;
   i) Year 3, until further application of milky spore is required, while forsythia is blooming, but before lilacs bloom, applying corn gluten organic weed/feed to lawn at about 50 lbs./2500 sq. ft.;
   j) at about 50–60 days after Step i) applying 100% poultry manure organic lawn/plant fertilizer to lawn at about 50 lbs./2500 sq. ft.;
   k) at about 50–60 days after Step k) applying 100% poultry manure organic lawn/plant fertilizer to lawn at about 50 lbs./2500 sq. ft.;
   l) at about 50–60 days after Step k) applying 100% poultry manure organic lawn/plant fertilizer to lawn at about 50 lbs./2500 sq. ft.

2. A method for a 3 year program for treating a lawn comprising the steps of:
   a) in year 1 in early spring while forsythia is blooming, but before lilacs bloom, applying corn gluten organic weed/feed to lawn at about 50 lbs./2500 sq. ft.
   b) in year 1 in late spring/early summer applying 100% poultry manure organic lawn/plant fertilizer to lawn at about 50 lbs./2500 sq. ft.;
   c) in year 1 in mid to late summer applying milky spore organic soil conditioner to lawn at about 20 lbs./7000 sq. ft.;
   d) in year 1 in late fall applying corn gluten organic weed/feed to lawn at about 50 lbs./2500 sq. ft;
   e) in year 2 in early spring, while forsythia is blooming, but before lilacs bloom, applying corn gluten organic weed/feed to lawn at about 50 lbs./2500 sq. ft.;

f) in year 2 in late spring/early summer applying 100% poultry manure organic lawn/plant fertilizer to lawn at about 50 lbs./2500 sq. ft.;

g) in year 2 in mid to late summer applying milky spore organic soil conditioner to lawn at about 20 lbs./7000 sq. ft.;

h) in year 2 in late fall applying 100% poultry manure organic lawn/plant fertilizer to lawn at about 50 lbs./2500 sq. ft.;

i) in year 3, while forsythia is blooming, but before lilacs bloom, until further application of milky spore is required, in early spring applying corn gluten organic weed/feed to lawn at about 50 lbs./2500 sq. ft.;

j) in year 3, in late spring/early summer, mid to late summer and late fall applying 100% poultry manure organic lawn/plant fertilizer to lawn at about 50 lbs./2500 sq. ft.

* * * * *